(12) United States Patent
Minnihan et al.

(10) Patent No.: US 6,244,026 B1
(45) Date of Patent: Jun. 12, 2001

(54) CROP LIFTER MECHANISM

(75) Inventors: James William Minnihan, Moline, IL (US); Jose Luiz Veiga Leal, Sorocaba-SP (BR)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/362,650

(22) Filed: Jul. 27, 1999

(51) Int. Cl.[7] ............................. A01D 57/22; A01D 65/02
(52) U.S. Cl. .................................................. 56/119
(58) Field of Search .......................... 56/119, 121.42, 56/94, 126, 219

(56) References Cited

U.S. PATENT DOCUMENTS

| | | | |
|---|---|---|---|
| 2,133,905 | * | 10/1938 | Rund, Jr. . |
| 2,653,436 | * | 9/1953 | Warner . |
| 3,421,303 | * | 1/1969 | Kammerzell . |
| 4,269,018 | * | 5/1981 | Pickett . |
| 4,301,644 | * | 11/1981 | Henderson . |
| 4,704,850 | * | 11/1987 | Obermeier . |
| 5,906,091 | * | 5/1999 | Gemar . |

\* cited by examiner

*Primary Examiner*—Robert E. Pezzuto
(74) *Attorney, Agent, or Firm*—Richard G. Lione; Brinks Hofer Gilson & Lione

(57) ABSTRACT

A crop lifter for the header assembly of an agricultural combine. The crop lifter includes a lifter arm in the form of a longitudinally elongated panel which has a lifting tip at its leading end. The panel is vertically oriented and has a crop lifting surface extending along its upper edge. Extending laterally of the panel are a pair of flexible crop lifting wings which expand the effective lifting area of the crop lifter. The crop lifting surface has an initially steep incline followed by a shallower incline.

4 Claims, 2 Drawing Sheets

CROP LIFTER MECHANISM

FIELD OF THE INVENTION

This invention relates generally to agricultural combines. It relates particularly to the crop harvesting header assembly of an agricultural combine.

BACKGROUND OF THE INVENTION

The crop harvesting header assembly of an agricultural combine is conventionally mounted on the front end of the chassis in the combine. The header assembly extends forwardly of the front wheels of the combine and cuts a wide swath of the crop as the combine is driven through the standing crop in a field. The header assembly is connected to the combine body on the chassis by a cut crop feeder assembly. The feeder assembly carries the cut crop upwardly and rearwardly into the combine's threshing assembly.

The header assembly is conventionally cantilevered from the front end of the combine chassis on the feeder assembly, which permits it to move up and down and tilt relative to the combine's longitudinal axis so that a cutter bar extending transversely across the front of the header assembly is free to follow the contour of the field. The cutter bar and, accordingly, the header assembly are supported for travel over the terrain at a uniform height on a series of runners which depend from the trailing edge of the cutter bar. A crop cutter blade is mounted in the cutter bar for reciprocating cutting movement longitudinally of the bar.

Depending upon the crop being harvested, a header assembly may include a series of crop lifter arms mounted on a cutter bar guard and extending forwardly from it. The crop lifter arms are spaced twelve to eighteen inches from each other along the cutter bar guard, transversely of the header assembly. With a twenty-four foot wide header assembly harvesting a vine-type crop such as soy beans, for example, it is conventional to have as many as twenty crop lifter arms mounted on the cutter bar guard in relatively closely spaced relationship.

In a conventional set-up, the closely spaced crop lifter arms are mounted on the cutter bar guard, forwardly of, and below, the guard point. The lifter arms are mounted on the cutter bar guard for limited vertical pivoting movement.

Each lifting arm has a crop lifting surface extending the length of its upper edge. The angle of the lifting surface on each lifter arm relative to the ground is steep along virtually its entire length, e.g., an angle of about 45° is typical.

The aforedescribed conventional construction and set-up of crop lifter arms in a header assembly for an agricultural combine has numerous shortcomings, however. It results in the crop being cut off relatively high and at inconsistent heights. It results in foreign material easily entering the cutting blade area. It creates a substantial amount of stress in the cutter bar guard and related structure.

SUMMARY OF THE INVENTION

It is an object of the present invention to provide an improved crop lifter for the header assembly of an agricultural combine.

It is another object to provide a crop lifter which easily permits lower crop cutting heights to be achieved.

It is still another object to provide a crop lifter which results in a more consistent cutting height being maintained across a field.

It is yet another object to provide a crop lifter which assures that relatively long bean pods or vine type crops are always lifted above the vine cutter blade in the header assembly.

It is yet another object to provide a crop lifter which reduces the amount of foreign material entering the cutting blade area in the header assembly.

It is a further object to provide a crop lifter which causes less stress on the cutter bar, blade and guard structure.

It is still a further object to provide a crop lifter which has more ground clearance when mounted on the cutter bar guard.

It is another object to provide a crop lifter sub-assembly including a lifter arm having lifting wings which effectively bridge the gap between adjacent arms and greatly enhance the lifting effect of the lifter arms.

It is yet another object to provide a crop lifter sub-assembly which permits fewer lifter arms to be used across the width of a header assembly, resulting in lower overall cost.

The foregoing and other objects are realized by providing a crop lifter arm which combines high initial lift with a shallow lifting angle of the lifting surface near the top of the arm. The shallow angle combined with the higher initial lift makes the lifter arm well suited for vine-type crops. The lifting surface on the lifter arm has a 38°±5° lift angle at the front and a 24°±5° lift angle near the rear. The steep angle at the front lifts the crop rapidly. The shallow angle on the remainder of the surface gradually lifts the crop, while reducing friction, and substantially prevents plugging from occurring.

The crop lifter arm configuration of the invention produces a wide separation between the top surface of the lifter arm and the cutter bar, a separation which is a minimum of 160 mm±25 mm. The effect of this wide separation is to prevent bean pods from hitting the cutter blade and greatly reduces crop loss.

The crop lifter arm has a pair of laterally extending lifting wings or whiskers fastened to it. The lifting wings are formed of spring steel wire and extend rearwardly from the mounting point of the arm. The lifter arm and wings form a crop lifter sub-assembly which provides a substantial crop lifting effect across a wide area over each lifting arm and, accordingly, reduces the number of lifter arms needed.

BRIEF DESCRIPTION OF THE DRAWINGS

The invention, including its method of construction, is illustrated more or less diagrammatically in the drawings, in which.

DESCRIPTION OF THE PREFERRED EMBODIMENT

Figure 1:
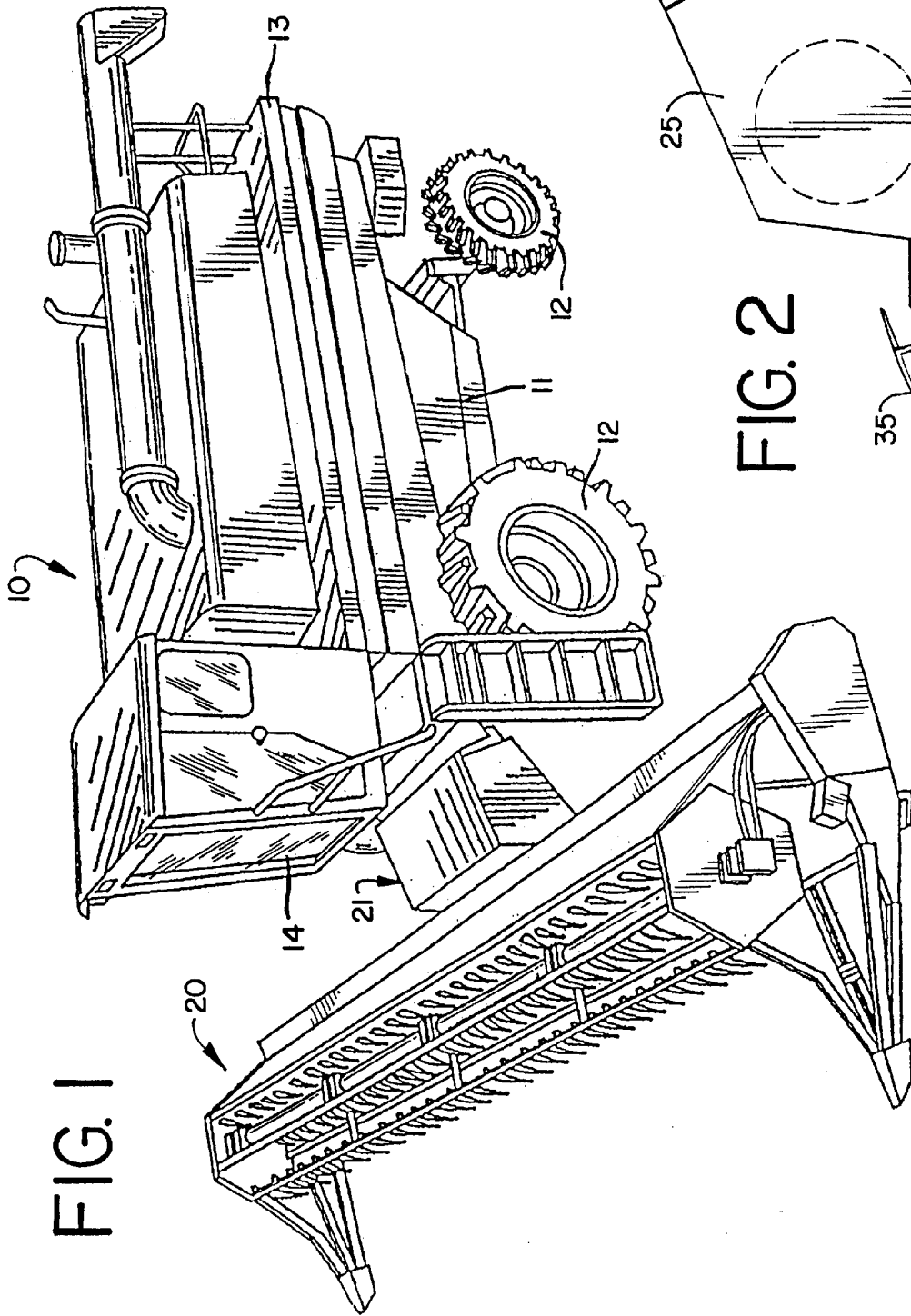
FIG. 1 is a perspective view of an agricultural combine having a crop header assembly incorporating a series of crop lifter arm mechanisms embodying features of the present invention.

Referring now to the drawings, and particularly to FIG. 1, an agricultural combine is illustrated generally at 10. The combine 10 includes a chassis 11 mounted on four wheels 12, at least two of which are normally driven. The chassis 11 supports the combine body 13 and an operators cab 14.

Supported in a well-known manner from the front end of the chassis 11 is a header assembly 20. The header assembly 20 is connected to the chassis by a crop feeder assembly 21. The connection permits the header assembly 20 to rise and fall, as well as tilt, to follow the field terrain on which the combine 10 is operating.

Figure 2:
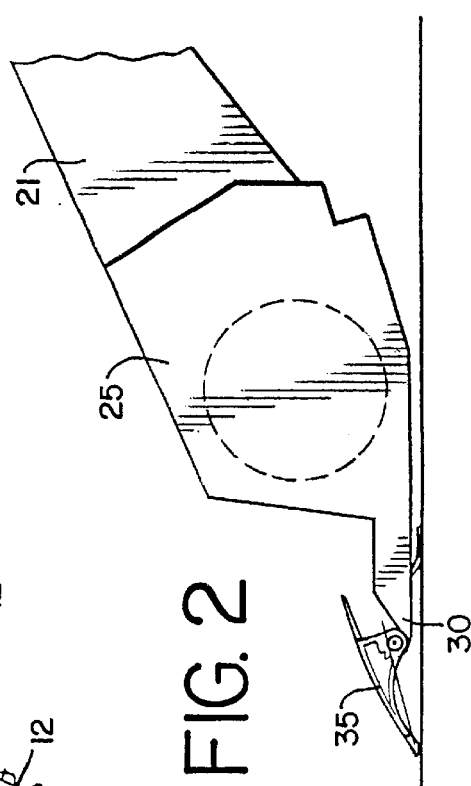
FIG. 2 is an enlarged side elevational view of the crop header assembly illustrated in FIG. 1.
Figure 3:
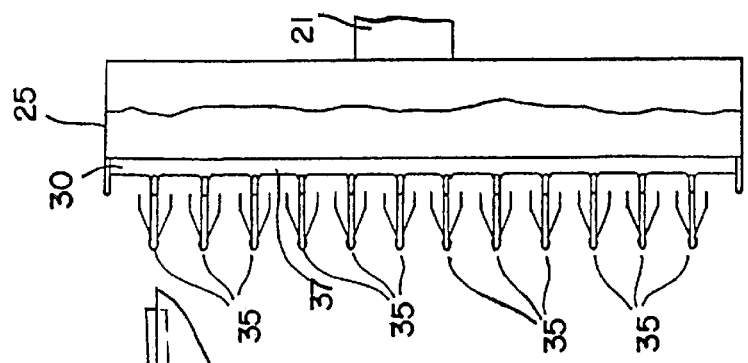
FIG. 3 is a top plan view of the header assembly illustrated in FIG. 2.

Referring now to FIGS. 2 and 3, the header assembly 20 which is illustrated here is twenty-four feet wide, although it may be anywhere between fifteen and forty-five feet wide. It includes a header housing 25. The housing 25 is mounted on the front end of the feeder assembly 21. The header assembly 20 includes a crop cutter sub-assembly 30 which extends across the lower front of the housing 25. According to the invention, a series of twelve crop lifter subassemblies 35 are mounted on the cutter sub-assembly 30, in spaced relationship across the width of the header assembly 20.

Figure 4:
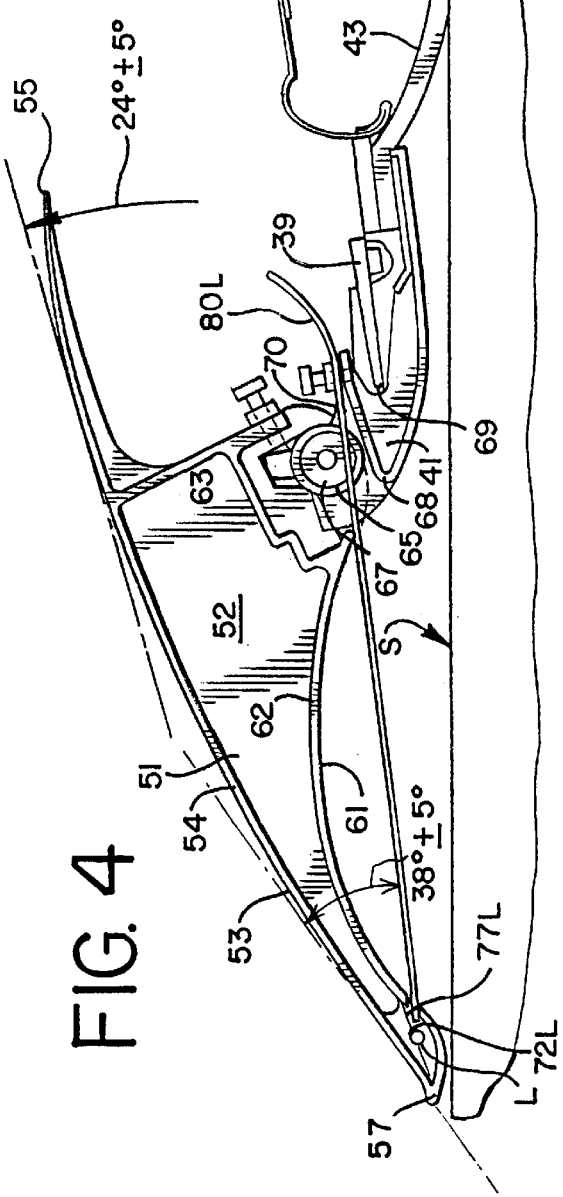
FIG. 4 is a further enlarged side elevational view of a crop lifter arm mechanism embodying features of the present invention.

Referring to FIG. 4 in addition to FIGS. 2 and 3, the cutter sub-assembly on which the crop lifter sub-assemblies 35 are mounted includes a cutter bar 37. The cutter bar 37 extends across the width of the housing 25. Seated in the cutter bar 37, for reciprocating cutting movement, is a cutter blade 39. The blade 39 is reciprocated in a well-known manner by a drive mechanism (not shown) to cut crop stems close to the ground during the harvesting operation.

A longitudinally spaced series of cutter bar guards are mounted on the cutter bar 37 and extend forwardly from it. A skid member 43 extends rearwardly and downwardly from each guard 41. The cutter bar 37 and, accordingly, the header assembly 25, is supported for travel over the terrain surface S of the crop field on the skid members 43 as the combine 10 moves through a field.

During harvesting operation of the combine 10, the skid members 43 slide over the terrain surface S and, in doing so, support the cutter sub-assembly 30 at a constant height above the surface, regardless of undulations in the terrain. The crop lifter subassemblies 35, which are cantilevered forwardly from the cutter bar guards 41, travel over the surface S at a constant height also.

Figure 5:
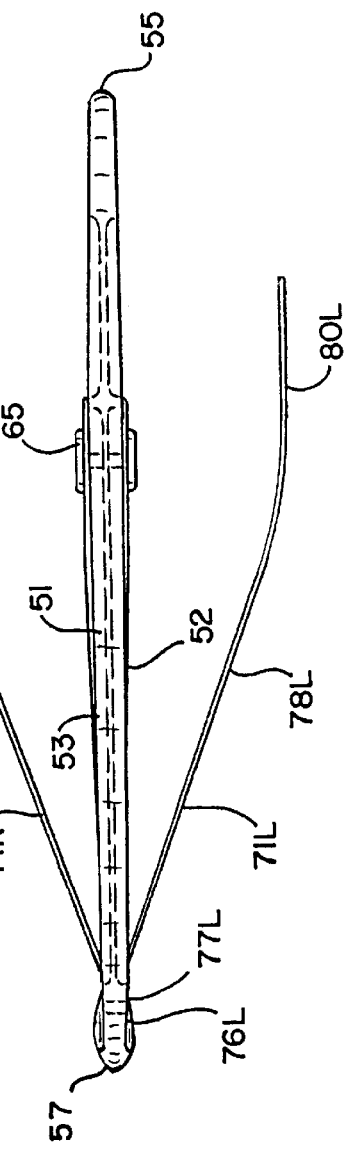
FIG. 5 is a top plan view of the crop lifter arm illustrated in FIG. 4, showing lifter arm wings bracketing the arm.

Referring now to FIG. 5, in addition to FIGS. 1–4, each crop lifter sub-assembly 35 includes a lifting arm 51. Each lifting arm 51 is formed of molded plastic, cast metal or sheet metal in the form of an elongated, vertically oriented panel 52. The panel 52 has a flat upper surface 53 formed on a flange 54 which curves downwardly from the trailing end 55 of the flange to a leading tip 57 of the panel. The surface 53 curves from a shallow incline of 24°±5° near the trailing end 55 to a steep incline of 38°±5° near the leading tip 57.

Beneath the flange 54 and upper surface 53, the panel 52 extends downwardly to a flat bottom surface 61 formed on a flange 62. The flange 62. and bottom surface 61 curve upwardly from the leading tip 57, and then downwardly to a mounting fitting 63 formed integrally with the lifting arm 51.

The fitting 63 has an aperture 65 extending transversely through it. The aperture 65 receives a mounting pin 67. The mounting pin 67 extends horizontally from one side of a mounting bracket 70 which is formed unitarily with a corresponding cutter guard 41.

The lifting arm 51 is mounted on the pin 67 for limited pivotal movement about the axis of the pin. The arm 51 is spring loaded between the fitting 53 and pin 67 into its forwardmost position on that axis, as seen in FIG. 4. However, if the tip 57 of the arm 51 engages an obstacle as it travels over the ground, the spring (not shown) permits resilient movement of the arm upwardly about four inches against the bias of the spring.

Each lifting arm 51 is preferably about 460 mm long and about 20 mm wide (at the flanges 54 and 62). The arm 51 is constructed and arranged so that the flat upper surface 53 on the panel 52 is 160 mm ±25 mm above the cutting blade 39 at the point where the surface 53 passes directly over the cutting edge 69 of the blade. The pivot pin 67 on which the arm 51 is mounted is above and slightly behind the tip 68 of the blade guard 41. The significance of these relationships will hereinafter be discussed in relation to the operation of the combine 10.

According to the invention, each lifting arm 51 has a pair of crop lifter wings or whiskers 71L and 71R mounted on its left and right sides, as seen in FIG. 5. The wings 71L and 71R, which are mirror images of each other, are formed of heavy gauge, spring steel wire. Each wire wing is preferably about 400 mm long.

The wing 71L, for example, has a fastener eye 75L formed at its front end. The eye 75L is fastened to the left side of the lifting arm tip 57. Rearwardly of the eye 75L, the wing 71L comprises a short wire segment 76L. seated in a rearwardly extending but slightly upwardly inclined groove 77L in the side of the tip 57. The wire segment 76L is thus rigidly supported in the groove 77L.

Rearwardly of the short wire segment 76L, an intermediate wire segment 78L of the wing 71L diverges from the lifting arm 51 until it reaches a point approximately as far back as the mounting fitting 63 in the lifting arm panel 52. At this point, a trailing wire segment 80L of the wing 71L begins, and extends parallel to the panel 52 until it has passed over the cutter blade 37.

Referring again to FIG. 4, as well as FIG. 5, it will be seen that the wing 71L is inclined upwardly at a slight angle of about 5° until it reaches a point over the cutting edge of the cutter blade. At that point, the trailing wire segment 80L of the wing 71L curves upwardly to its free end.

The wing 71R is identical to the wing 71L, albeit in mirror image. The result is a diverging wing or whiskers 71L, 71R arrangement, as seen in FIG. 5, with the trailing ends of the wings and curved upwardly. At their widest span, between the trailing wire segments 80L and 80R of the wings 71L and 71R, respectively, the wings preferably have a span of about 200 mm.

In operation of a combine 10 having a header assembly 20 incorporating crop lifter sub-assemblies 35 embodying features of the invention, the tips 57 of the lifter arms 51 travel over the terrain surface S at the base of the crop stems. The steep angle of the surface 53 on each wing panel 52 adjacent the tip 57 lifts the pod bearing upper portions of the stems (for example) rapidly, and holds the crop pods above the cutter blade 39.

The lifting angle of the surface 53 at its trailing end is shallow so that frictional force is low as the crop is cut by the reciprocating cutter blade 39. The shallower angle of the surface in this location prevents plugging of the crop.

The wings 71L and 71R provide laterally expanded lifting surfaces in each lifter arm sub-assembly 35. The wings 71L and 71R move in unison with corresponding lifting arms 51, flexing and providing a wide span of lifting action which effectively bridges the gap between adjacent arms, making it unnecessary to use a large number of arms. Having less mass than additional arms, the wings 71L and 71R put less stress on the cutter sub-assembly 30. By reducing the number of lifting arms 51 needed, overall cost is also reduced.

The crop lifter sub-assemblies 35 are, according to the present invention, mounted on pins 67 which are above and behind the tips 68 of the blade guard members 41. As a result, the lifter sub-assemblies 35 have excellent ground clearance and superior ground following ability, even in uneven terrain.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. In a combine header assembly incorporating a crop cutter, the improvement in a crop lifter, comprising:

a) a lifter arm extending forwardly from said crop cutter;

b) said lifter arm including a leading end tip and a crop lifting surface inclined upwardly relative to the horizontal from said tip to a trailing end of said lifter arm;

c) the incline of said crop lifting surface relative to the horizontal being 38°±5° adjacent said leading end tip and 24°±5° adjacent said trailing end;

d) said crop lifter surface being at least 160±25 ° mm above said crop cutter adjacent said trailing end.

2. In a combine header assembly incorporating a crop cutter, the improvement in a crop lifter, comprising:

a) a lifter arm extending forwardly from said crop cutter;

b) said lifter arm including a leading end tip and a crop lifting surface inclined upwardly relative to the horizontal from said tip to a trailing end of said lifter arm;

c) the incline of said crop lifting surface relative to the horizontal being 38°±5° adjacent said leading end tip and 24°±5° adjacent said trailing end;

d) said crop lifter surface being at least 160±25 mm above said crop cutter adjacent said trailing end;

e) said crop cutter including a crop cutter blade and a blade guard, said guard having a leading end guard point;

f) said lifter arm being pivotably connected to said blade guard above said cutter blade;

g) said pivot connection between said lifter arm and said blade guard being rearwardly of said guard point.

3. In a combine header assembly incorporating a crop cutter, the improvement in a crop lifter, comprising:

a) a lifter arm extending forwardly from said crop cutter;

b) said lifter arm including a leading end tip and a crop lifting surface inclined upwardly relative to the horizontal from said tip to a trailing end of said lifter arm;

c) said lifter arm comprising a vertically oriented panel having a horizontally disposed flange defining its upper edge and upon which said lifting surface is disposed;

d) the incline of said crop lifting surface relative to the horizontal being substantially greater adjacent said leading end tip than adjacent said trailing end; and e) a pair of wing members mounted on opposite sides of said panel and diverging laterally of said panel from said tip leading end;

f) each of said wing members comprising a spring steel wire member which is rigidly connected to said leading end tip and extends rearwardly from said tip.

4. A crop lifter for an agricultural combine, comprising:

a) a crop lifter arm;

b) said crop lifter arm including a leading end tip and a crop lifting surface inclined upwardly relative to the horizontal from said tip; and c) a pair of wing members mounted on opposite sides of said lifter arm and diverging laterally of said lifter arm from said leading end tip;

d) each of said wing members comprising a spring steel wire member which is rigidly connected to said tip leading end and extends rearwardly from said tip to a trailing end;

e) each of said wing members being curved upwardly adjacent its trailing end.

* * * * *